(12) United States Patent
Datta et al.

(10) Patent No.: US 9,158,972 B2
(45) Date of Patent: *Oct. 13, 2015

(54) ESTIMATION OF OBJECT PROPERTIES IN 3D WORLD

(71) Applicant: International Business Machines Corporation, Armonk, NY (US)

(72) Inventors: Ankur Datta, White Plains, NY (US); Rogerio S. Feris, Hartford, CT (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,242

(22) Filed: Sep. 5, 2014

(65) Prior Publication Data

US 2014/0376775 A1 Dec. 25, 2014

Related U.S. Application Data

(63) Continuation of application No. 13/154,843, filed on Jun. 7, 2011, now Pat. No. 8,842,163.

(51) Int. Cl.
*H04N 13/00* (2006.01)
*G06K 9/00* (2006.01)
(Continued)

(52) U.S. Cl.
CPC ........ *G06K 9/00711* (2013.01); *G06K 9/00771* (2013.01); *G06T 3/40* (2013.01); *G06T 7/0046* (2013.01); *G06T 7/2046* (2013.01); *G06T 2207/10016* (2013.01); *G06T 2207/30232* (2013.01); *G06T 2207/30236* (2013.01)

(58) Field of Classification Search
None
See application file for complete search history.

(56) References Cited

U.S. PATENT DOCUMENTS 7,580,547 B2   8/2009   Benhammou
8,379,926 B2   2/2013   Kanhere et al.
(Continued)

FOREIGN PATENT DOCUMENTS

EP   2287782 A2   2/2011

OTHER PUBLICATIONS

U.S. Appl. No. 13/154,843—Filing Date Jun. 7, 2011; GAU 2481; Confirmation No. 1798.
(Continued)

*Primary Examiner* — Heather Jones
(74) *Attorney, Agent, or Firm* — Patrick J. Daugherty; Driggs, Hogg, Daugherty Del Zoppo Co., LPA

(57) ABSTRACT

Objects within two-dimensional video data are modeled by three-dimensional models as a function of object type and motion through manually calibrating a two-dimensional image to the three spatial dimensions of a three-dimensional modeling cube. Calibrated three-dimensional locations of an object in motion in the two-dimensional image field of view of a video data input are determined and used to determine a heading direction of the object as a function of the camera calibration and determined movement between the determined three-dimensional locations. The two-dimensional object image is replaced in the video data input with an object-type three-dimensional polygonal model having a projected bounding box that best matches a bounding box of an image blob, the model oriented in the determined heading direction. The bounding box of the replacing model is then scaled to fit the object image blob bounding box, and rendered with extracted image features.

20 Claims, 6 Drawing Sheets

(51) Int. Cl.
*G06T 7/20* (2006.01)
*G06T 3/40* (2006.01)
*G06T 7/00* (2006.01)

(56) References Cited

U.S. PATENT DOCUMENTS

| | | |
|---|---|---|
| 2004/0105573 A1 | 6/2004 | Neumann et al. |
| 2009/0009513 A1 | 1/2009 | van den Hengel et al. |
| 2009/0309966 A1 | 12/2009 | Chen et al. |
| 2010/0202662 A1 | 8/2010 | Chung |
| 2010/0286827 A1 | 11/2010 | Franzius et al. |
| 2010/0322476 A1 | 12/2010 | Kanhere et al. |

OTHER PUBLICATIONS

Notice of Allowance (Mail Date May 23, 2014) for U.S. Appl. No. 13/154,843—Filing Date Jun. 7, 2011; GAU 2481; Confirmation No. 1798.

ESTIMATION OF OBJECT PROPERTIES IN 3D WORLD

BACKGROUND

The present invention relates to estimating properties of three-dimensional (3D) objects in two-dimensional (2D) video data.

Understanding and determining the import of the various object movements, for example a person approaching an area or taking some sort of action that exposes that person or others to a heightened hazard risk, may be difficult from 2D video data streams. Human operators may be required to simultaneously review and analyze multiple monitors or display windows for object movements, and the 2D nature of video data may make object recognition and tracking by the human eye difficult, particularly in visually rich or noisy environments.

Object tracking and recognition may be improved when 2D video data objects are modeled with 3D models, in one aspect as recognizing and tracking 3D objects is inherently more intuitive to human observers. However, adequately rendering such 3D models with regard to moving objects is a complex process, generally requiring complex data processing and/or data inputs from other cameras or other devices, such as range, image and/or object tracking sensors, making robust modeling difficult to achieve.

BRIEF SUMMARY

In one embodiment of the present invention, a method for modeling objects within two-dimensional (2D) video data by three-dimensional (3D) models as a function of object type and motion includes calibrating a 2D image field of view of a video data input of a camera to three spatial dimensions of a 3D modeling cube via a user interface of an application executing on a processor. In response to observing an image of an object in motion in the 2D image field of view of a video data input, a processor determines 3D locations of the observed 2D object image as intersections between a ground plane of the calibrated camera field of view and respective backward projected lines each passing through a center of the calibrated camera and respective points on the object 2D image within a focal, and thereby determines a heading direction of the object as a function of the calibrating of the camera and a movement between the determined 3D locations. The 2D object image is replaced in the video data input with an object-type 3D polygonal model having a projected bounding box that best matches a bounding box of an image blob, the model oriented in the determined heading direction. The bounding box of the replacing model is then scaled to fit the object image blob bounding box, and the scaled model rendered with image features are extracted from the 2D image data as a function of the calibrated dimensions.

In another embodiment, a system has a processing unit, computer readable memory and a computer readable storage medium device, wherein the processing unit executes program instructions stored on the computer-readable storage medium via the computer readable memory, to calibrate a 2D image field of view of a video data input of a camera to three spatial dimensions of a 3D modeling cube provided by a user manually via a user interface. In response to observing an image of an object in motion in the 2D image field of view of a video data input, the processing unit thus determines 3D locations of the observed 2D object image as intersections between a ground plane of the calibrated camera field of view and respective backward projected lines each passing through a center of the calibrated camera and respective points on the object 2D image within a focal plane, and thereby determines a heading direction of the object as a function of the calibrating of the camera and a movement determined between the determined 3D locations. The 2D object image is replaced in the video data input with an object-type 3D polygonal model having a projected bounding box that best matches a bounding box of an image blob, the model oriented in the determined heading direction. The bounding box of the replacing model is then scaled to fit the object image blob bounding box, and the scaled model rendered with image features are extracted from the 2D image data as a function of the calibrated dimensions.

In another embodiment, an article of manufacture has a computer readable storage medium device with computer readable program code embodied therewith, the computer readable program code comprising instructions that, when executed by a computer processor, cause the computer processor to calibrate a 2D image field of view of a video data input of a camera to three spatial dimensions of a 3D modeling cube provided by a user manually via a user interface. In response to observing an image of an object in motion in the 2D image field of view of a video data input, the processing unit thus determines 3D locations of the observed 2D object image as intersections between a ground plane of the calibrated camera field of view and respective backward projected lines each passing through a center of the calibrated camera and respective points on the object 2D image within a focal plane, and thereby determines a heading direction of the object as a function of the calibrating of the camera and a movement determined between the determined 3D locations. The 2D object image is replaced in the video data input with an object-type 3D polygonal model having a projected bounding box that best matches a bounding box of an image blob, the model oriented in the determined heading direction. The bounding box of the replacing model is then scaled to fit the object image blob bounding box, and the scaled model rendered with image features are extracted from the 2D image data as a function of the calibrated dimensions.

In another embodiment, a method for providing a service for modeling objects within two-dimensional (2D) video data by three-dimensional (3D) models as a function of object type and motion includes providing one or more articles, including camera calibration interface that enables a user to manually calibrate a 2D image field of view of a video data input of a camera to three spatial dimensions of a 3D modeling cube. In response to observing an image of an object in motion in the 2D image field of view of a video data input, a 3D location determiner determines 3D locations of the observed 2D object image as intersections between a ground plane of the calibrated camera field of view and respective backward projected lines each passing through a center of the calibrated camera and respective points on the object 2D image within a focal plane, and a heading direction determiner determines a heading direction of the object as a function of the calibrating of the camera and a movement determined between the determined 3D locations. A model selector replaces the 2D object image in the video data input with an object-type 3D polygonal model having a projected bounding box that best matches a bounding box of an image blob, the model oriented in the determined heading direction. A model scaler scales the bounding box of the replacing model to fit the object image blob bounding box, and the scaled model rendered by a feature extractor with image features extracted from the 2D image data as a function of the calibrated dimensions.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
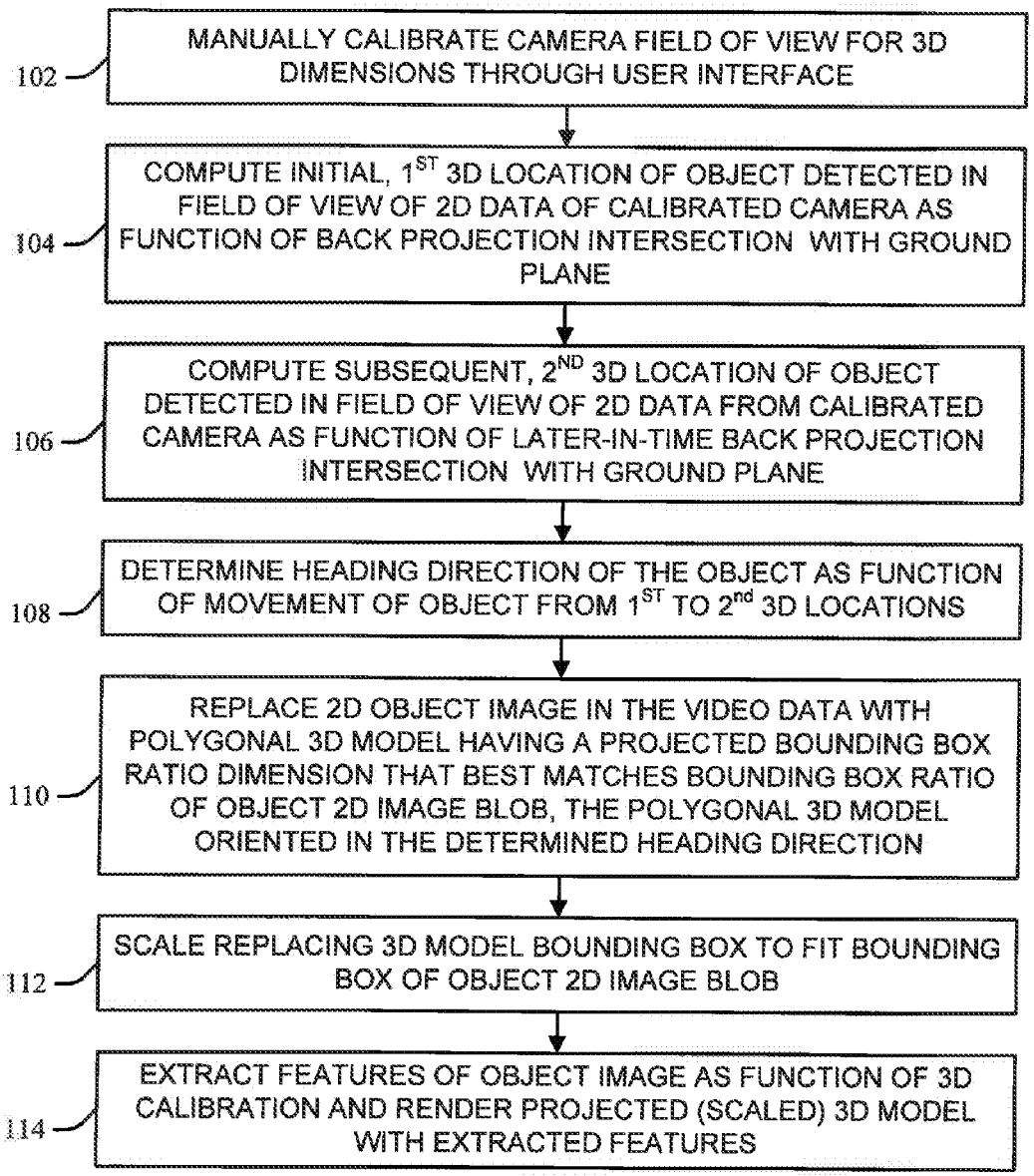
FIG. 1 is a flow chart illustration of an embodiment of a method or system for modeling objects within 2D video data by 3D models as a function of object type and motion according to the present invention.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an embodiment of a method, process or system for modeling objects within 2D video data by 3D models as a function of object type and motion according to the present invention is illustrated. At 102 a user manually calibrates a camera image field configuration through a user interface of an application executing on a device processor by specifying the three spatial dimensions (i.e. length x-axis, height y-axis and width z-axis dimension, each at right angles with respect to each other) of a 3D modeling cube within a 2D image field of view of a video data input.

In response to observing an object in motion in the field of view of 2D video data of the calibrated camera, at 104 an initial 3D location of the observed object is computed as the intersection between a ground plane of the calibrated camera field of view and one or more backward projected lines passing through a camera center and respective points (one for each of the lines) on the 2D object within a focal plane in the 2D image field of view. At 106 another, consecutively observed (subsequent in time) sample (or observation) of the object in the 2D video data focal plane is acquired and used to compute a second, later-in-time 3D location (as above at 104, thus as the intersection between the calibrated camera field-of-view ground plane and one or more backward projected lines passing through a camera center and respective points on the 2D object within the 2D image field-of-view focal plane). Object recognition and tracking may be practiced through a variety of processes and systems, for example through computer vision system object detection and tracking determined by a processor according to embodiments of the present invention, or from outputs of another system, process or device technology.

At 108 a heading direction of the object is determined as a function of the manual calibration of the camera and the relative movement observed of the object from the first 3D location (determined at 104) to the second, later location 3D location (determined at 106).

At 110 the 2D object image in the video data input is replaced with one of a plurality of object-type 3D polygonal models that has a projected bounding box that best fits or otherwise matches a bounding box ratio of an image blob of the 2D object image relative to others of the 3D polygonal models, the replacing further orienting the selected object-type 3D polygonal model in the determined heading direction. More particularly, each of the 3D polygonal models is for a different object type and has a different projected bounding box aspect ratio relative to the other models. Two similarities to the image blob bounding box are used to determine which model best fits the target object: a projected size-to-bounding box-ratio comparison, and a bounding box aspect ratio comparison, wherein the projected model bounding box that best match both similarities is selected as the best fit. For example, one embodiment determines ratios of projected sizes of each of the 3D polygonal model bounding boxes to the image blob bounding box, compares their aspect ratio values to an aspect ratio value of the image blob bounding box, and selects the model with the projected model bounding box that has a lowest determined ratio of projected size and an aspect ratio value that is closest to the aspect ratio value of the image blob bounding box.

Determining the best fit or match as a function of the two similarities comprehends a variety of combination methodology. For example, one embodiment may determine a weighted sum of the two measures. Embodiments may also use an "or" logic condition determination, finding a best fit if either one of these measures satisfies a strict threshold or criteria measure value or condition, or an "and" logic condition wherein both must meet respective threshold or criteria measure values/conditions. Still other embodiments of the present invention may weight or prefer one over the other, in some examples as a condition precedent for the other: for example, in one embodiment the aspect ratio similarity has a priority over the size-to-aspect-ratio similarity, wherein the size-to-aspect-ratio similarity is considered only if the aspect-ratio similarity satisfies a predefined condition.

At 112 the bounding box of the replacing polygonal 3D model is scaled to fit or otherwise correspond to the object image blob bounding box, and at 114 the scaled replacing polygonal 3D model is rendered with image features extracted from the 2D image data as a function of the calibrated dimensions of the 3D modeling cube.

Figure 2:
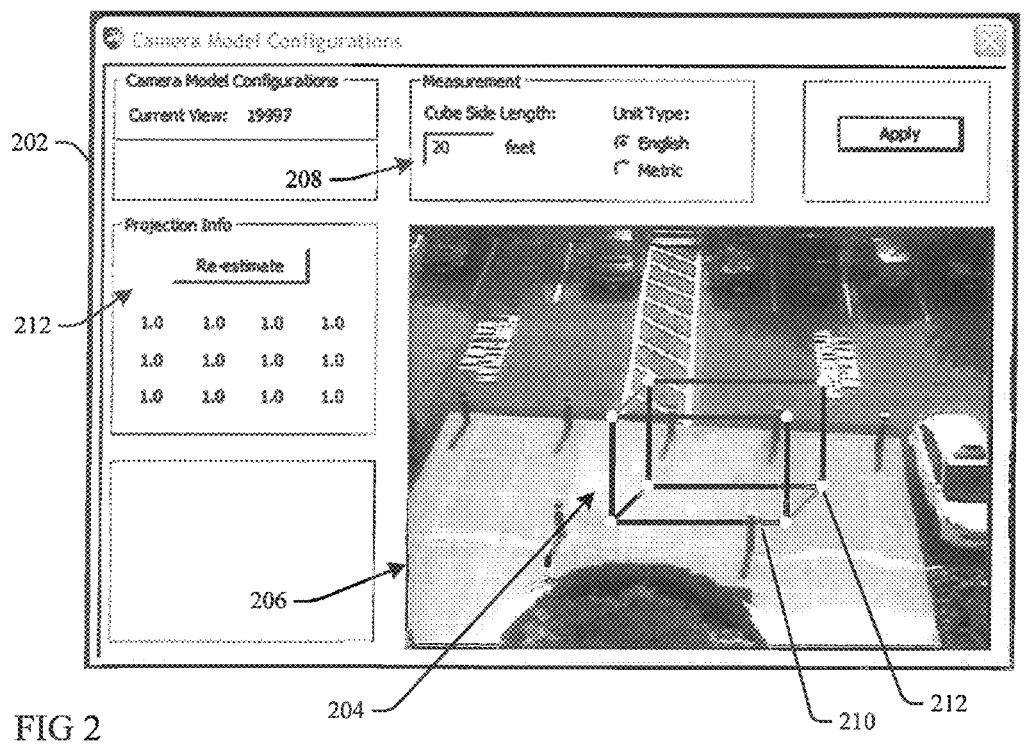
FIG. 2 is a diagrammatic illustration of an embodiment of a user interface for manual camera calibration according to the present invention.

FIG. 2 illustrates one embodiment of a user interface 202 for enabling a user to manually calibrate the camera configuration, including the camera's 3D location, orientation and focal length, to estimate 2D observed video objects in a 3D world modeling according to 102 of FIG. 1. Through the user interface 202 the user manually specifies a location of a 3D cube 204 within a field of view 206 of a 2D video image, and further directly enters 3D dimensional values for the dimensions of the sides 210 of the 3D model 204 (and thereby sizing the 3D cube 204) through dialog boxes and radio buttons, etc., 208, and wherein correspondences between 3D coordinates of the cube corners 212 and their projections in the image filed of view 206 are used to estimate the camera calibration (or projection) matrix. The video camera is thus calibrated to recover extrinsic camera parameters that place the camera within a spatial context of a 3D model of the environment of its field of view, the calibrating determining the camera's height, orientation and position in the world plane represented by the 2D video image data. The user interface 202 may also provide a re-estimation field 212 for manually re-estimating the calibration or projection matrix information for the 3D cube 204 when a user changes the 3D cube configuration.

Figure 3:
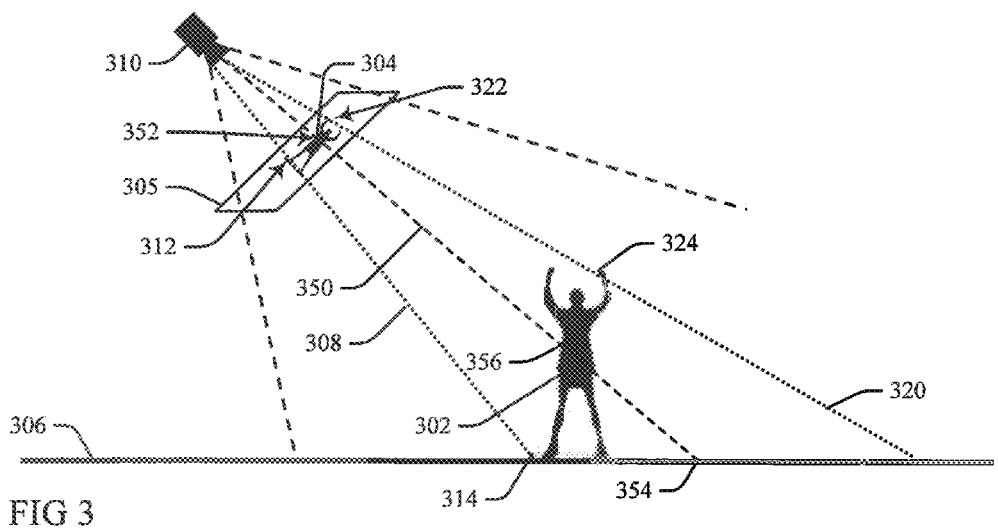
FIG. 3 is a diagrammatic illustration of a back projection modeling technique according to embodiments of the present invention.

FIG. 3 illustrates one example of computing the initial 3D location of the object at 104 of FIG. 1, wherein an initial calibrated 3D location 302 of the object image 304 observed in a focal plane 305 in the field of view is computed as an intersection 354 between a ground plane 306 and a backward projected line 350 passing through a center of the camera 310 and a centroid 352 of the 2D object image 304.

Figure 4:
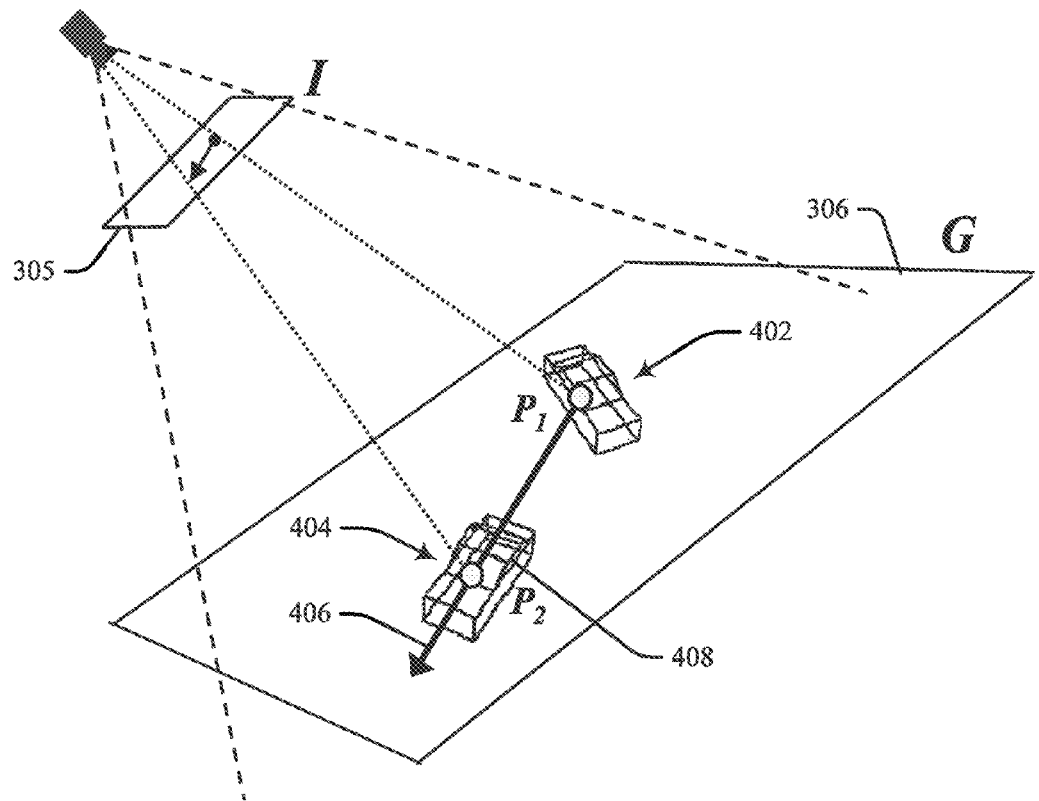
FIG. 4 is a diagrammatic illustration of back projection modeling according to embodiments of the present invention.

FIG. 4 illustrates an initial, first position $P_1$ 402 and a subsequent-in-time second position $P_2$ 404 of a 3D model according to embodiments of the present invention determined according to the back projection processes described above with respect to steps 104 and 106 of FIG. 1. A heading direction 406 of the object is determined pursuant to 108 of FIG. 1 as a function of the manual calibration of the camera and the relative movement observed of the object from the first 3D location 402 to the second, later 3D location 404 for use with orienting a projected 3D model 408 with respect to the ground plane 306. In some embodiments, utilizing a static calibrated camera, the heading direction for each second or subsequent, later positions may use the direction determined for a first or other previous determined observation position.

Figure 5:
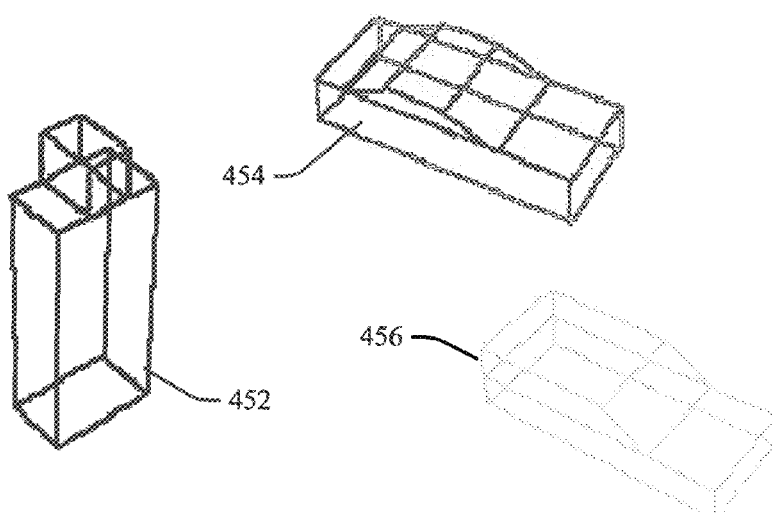
FIG. 5 is a diagrammatic illustration of polygonal 3D model examples according to embodiments of the present invention.
Figure 6:
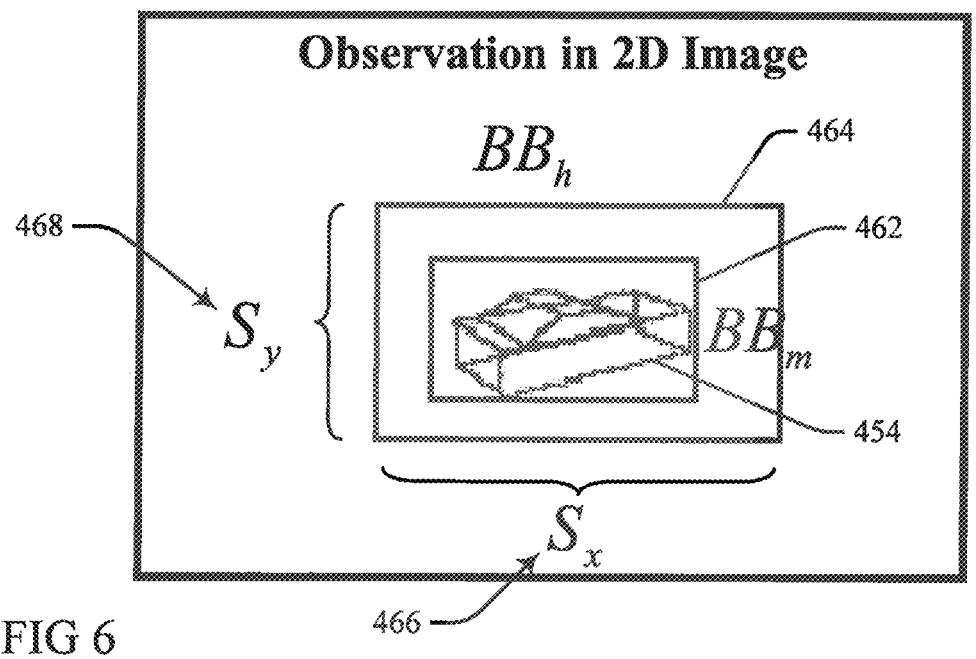
FIG. 6 is a diagrammatic illustration of model and object image blob bounding boxes according to embodiments of the present invention.

FIG. 5 illustrates examples of some different polygonal 3D models appropriate for use with different object types according to embodiments of the present invention, as a human model 452 for use with people object types, an automobile model 454 for use with automobile object types and a sport utility vehicle (SUV) model 456 for use with SUV or pick-up truck object types, and still other models may be practiced with embodiments of the present invention. Each of the models 452, 454 and 456 have different bounding box-ratio dimensions in the 3D world and in the 2D projection in the image plane, and thus the model with the bounding box-ratio dimensions that best matches the 2D object image when projected onto the 2D object image is selected for use with the object. For example, as shown in FIG. 6, the aspect ration of bounding box ratio $BB_m$ 462 of the automobile model 454 best matches the aspect ratio of bounding box $BB_h$ 464 of an image blob of the 2D object image, resulting in its selection for use with the object.

Scaling the selected model to fit the object image may comprehend a variety of scaling processes. In some embodiments, different object types may be efficiently scaled through different scaling processes, affording for efficiencies by avoiding unnecessary dimensional scaling. More particularly, some models may require scaling in only one, or no more than two, of the three spatial dimensions, wherein due to visual perceptions of the particular type of model, the remaining dimensions need not be scaled when used to replace the object image. Thus, some embodiments of the present invention may determine only a first of the spatial dimensions of the projected bounding box of the selected model and the object image blob bounding box, and thereby a first spatial dimension ratio between them, which is used to scale the bounding box of the selected model in that first dimension to match the object image blob bounding box. The model is then shifted to correspond with the object image blob, wherein a location point on a boundary box line of the selected model that corresponds to the same boundary box line of the object image blob is co-located with a corresponding point on said corresponding same boundary box line of the object image blob, wherein the selected model location point is on a back projection line comprising the corresponding point of the object image blob and the center of the calibrated camera.

For example, adults, children and other humanoid objects may have different heights as rendering in video data, but have generally similar width or length dimensions that do not require differentiated scaling between the different sizes (adult, child, etc.) in order to adequately render the object with a model within the video image for comprehension by a human reviewer of the video. Accordingly, some embodiments of the present invention may scale humanoid object-type models with regard to only the single height dimension, without a need to scale the other width and length dimensions of the 3D model. Thus, referring again to FIG. 3, one embodiment of the present invention estimates the height of a person object for scaling by: (i) determining a height of a selected, projected model 302; (ii) determining a height of the observed object by determining a distance from a top "head-area" point 322 of the bounding box of the 2D object image blob 304 to a corresponding bottom "foot" location 312, and wherein the foot location 312 may also be estimated as a turning point in a distance transform output; (iii) finding a ratio between the determined heights of the projected model 302 and the object blob 304 and scaling the person model 302 accordingly such that it matches with the observation; and (iv) shifting the 3D person model 302 such that its projected top location 324 (along a top boundary line 320 also passing through the camera 310 center, the top "head-area" point 322 of the 2D object blob 304 and intersecting the ground plane 306) co-locates with the top "head-area" point 322 of the bounding box of the 2D object image blob 304. The co-locating step (iv) may also comprise co-locating a projected bottom location point 314 intersecting the ground plane 306 on a bottom boundary line 308 back projected through the camera 310 center and a bottom boundary point 312 of the 2D object blob 304.

In contrast, the models for different vehicle objects such as sedan automobiles, SUV and cargo trucks, may require scaling multiples of their three spatial dimensions (length, height and width) to fit their corresponding objects to adequately render the vehicle objects within video images for comprehension by a human reviewer of the video. In one example, comparison of the projected bounding boxes of each of a plurality of 3D polygonal models as a function of the two similarities (the projected size-to-bounding box-ratio and the bounding box aspect ratio) finds that that the bounding box of the vehicle object-type model 454 best fits/matches the bounding box of an image blob of a 2D object image in the video data. Scaling factors in the horizontal $S_x$ 466 and vertical $S_y$ 468 (FIG. 6) directions are then determined by comparison of the model bounding box 462 to the bounding box 464 of the observed 2D vehicle in image, wherein each of the projected scaling factors $S_x$ 466 and $S_y$ 468 may be determined to have different values.

Figure 7:
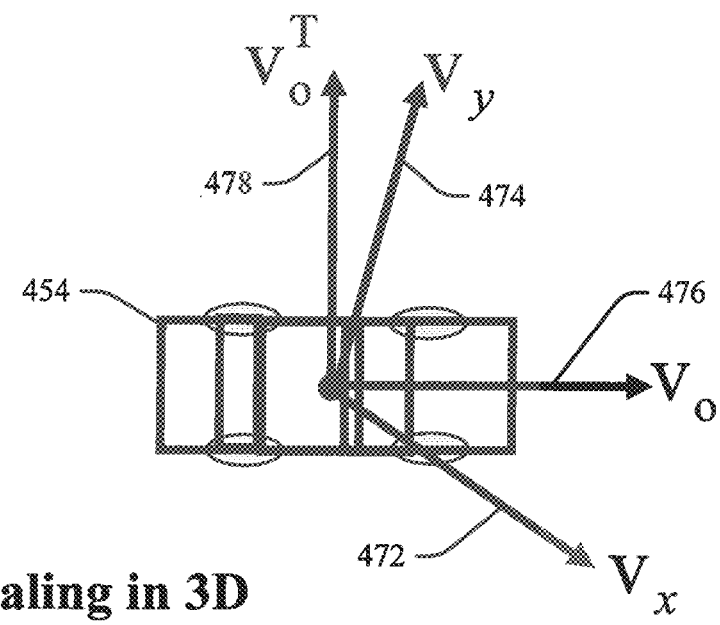
FIG. 7 is a diagrammatic illustration of determining dimensional vectors for models according to embodiments of the present invention.

More particularly, referring now to FIG. 7, a 3D width vector $V_x$ 472 is determined on the image ground plane 306 (FIG. 3) through alignment with an x-axis of the 2D object image blob bounding box in image space, and a 3D height vector $V_y$ 474 through alignment with a y-axis. A heading direction vector $V_o$ 476 is determined as a function of the manual calibration of the camera and the relative movement observed of the object from the first 3D location 402 (FIG. 4) to the second, later 3D location 404 (FIG. 4), wherein an orthogonal vector $V_o^T$ 478 is defined as the vector perpendicular to $V_o$ 476. Vector $V_o$ 476 is aligned with a length dimension of the vehicle in 3D, while $V_o^T$ 478 aligns with a width dimension. By projecting $V_x$ 472 to the vectors $V_o$ 476 and $V_o^T$ 478, the scaling factors for the length and width dimensions may be obtained as derived from the horizontal scaling factor $S_x$ 466 in the image plane, and the scaling factors in the length and width dimensions derived from the vertical factor $S_y$ 468 can be computed similarly. The derived scaling factors in the length dimension $V_o$ 476 may be summed to determine a final scaling factor in the length dimension. Similarly, derived scaling factors in the width dimension $V_o^T$ 478 may be summed to determine a final scaling factor in the width dimension.

The third dimension scaling factor is selected from one of the two final summed scaling factors of the other two dimensions. For example, as there is generally a limited relative variation between width and height scaling factors for vehicle models, embodiments of the present invention may use the same scaling factor for the width dimension in the scaling process for the height dimension. Accordingly, the selected vehicle model is scaled in all three spatial dimensions (length, width and height) such that its 2D projection in the image plane best fits with the image blob observation.

Figure 8A:
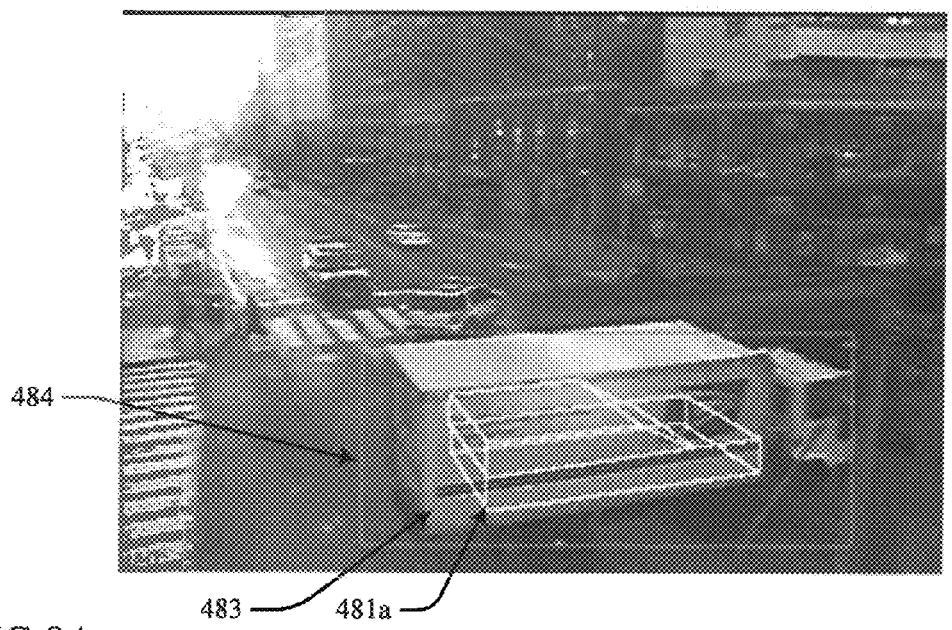
FIGS. 8A and 8B are diagrammatic illustrations of a projection of a polygonal 3D model on an object image according to embodiments of the present invention.
Figure 8B:
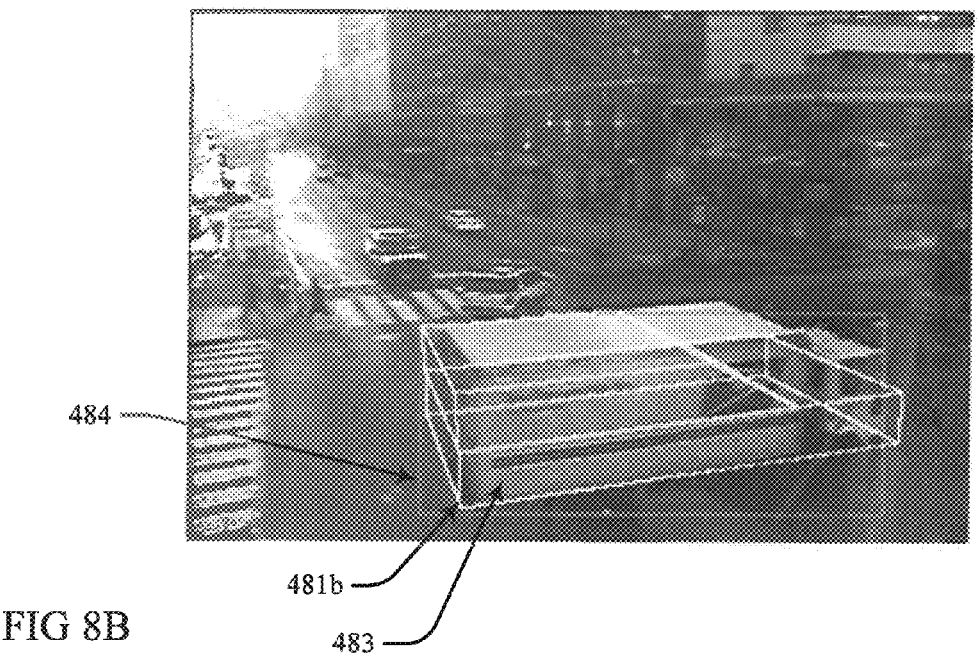

FIG. 8A shows an example of a polygonal model of a truck 481a before scaling as projected on a 2D image of a truck object 483 having an image blob bounding box 484, wherein FIG. 8B shows the model 481b as scaled larger 486 in each of its three spatial dimensions as described above with respect to FIGS. 6 and 7 to fit the truck object 483.

For feature extraction for rendering the model (114, FIG. 1), size features modeling actual size of the object in real-world measurements are determined as a function of the scaling factors $S_x$ 466 and $S_y$ 468 of the model. Speed may be determined as a ratio between 3D displacement of the object to a time difference value. Refinements may also be incorporated to obtain better results, for example computing average values over a period of time.

Thus, embodiments of the present invention solve problems in estimating properties of 3D objects in surveillance videos, such as object size in height, length and width in real-world metrics (e.g., feet, meters, etc.) as well as object speed (for example, kilometers or miles-per-hour) without complex camera calibration computations, which in the prior art generally requires the use of high-level mathematic equations to estimate a camera matrix. Other prior art methods use pseudo-calibration techniques wherein a user inserts artificial markers in the video image to interpolate object locations; however, such psuedo-3D are really just simple mappings from a 2D pixel location to a pre-calculated value, which many times is incorrect and results in failure to correctly perceive the object in by the viewer.

In contrast, embodiments of the present invention utilize manual calibration camera settings, for example including a camera's 3D location, orientation and focal length, to estimate the 2D observed video object's 3D world. Simple but robust 3D object models are selected that best fit the 2D observed objects in video, and features of the object models are estimated including location of the object on the ground plane. The object's 3D heading direction and the scale of the object models in the length, height and width dimensions are determined as a function of comparing a projected bounding box of the model to an underlying image blob bounding box of the object to be modeled. With the effective estimation of these properties, the object model that best fits the observed objects can be determined and scaled appropriately and, consequently, its 3D properties such as size and speed can be extracted.

Figure 9:
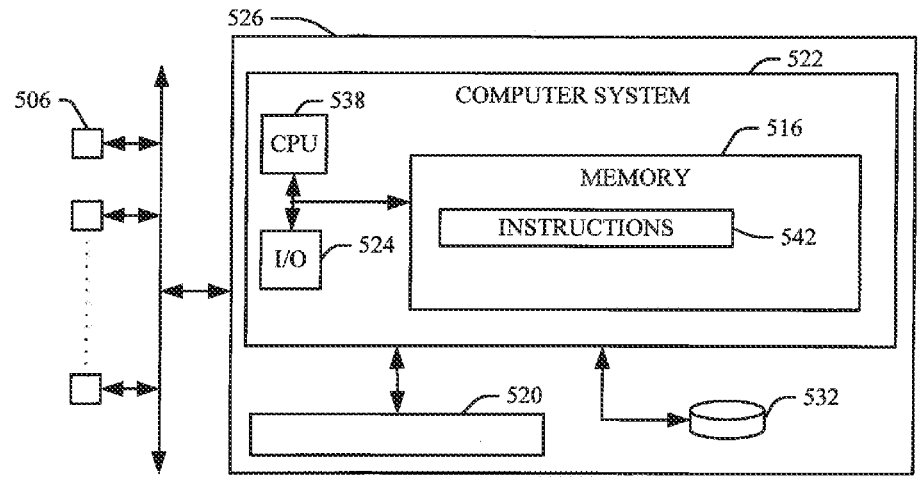
FIG. 9 is a block diagram illustration of a computerized implementation of an embodiment of the present invention.

Referring now to FIG. 9, an exemplary computerized implementation of an embodiment of the present invention includes a computer or other programmable device 522 in communication with one or more cameras or other imaging devices 506 (for example, video cameras or video servers, etc.). Instructions 542 reside within computer readable code in a computer readable memory 516, or in a computer readable storage system 532, another device 506 or other computer readable storage medium that is accessed through a computer network infrastructure 526 by a processing unit (CPU) 538. Thus, the instructions, when implemented by the processing unit (CPU) 538, cause the processing unit (CPU) 538 to represent objects tracked within 2D video data by 3D modeling as described above with respect to FIGS. 1 through 8A and 8B.

Figure 10:
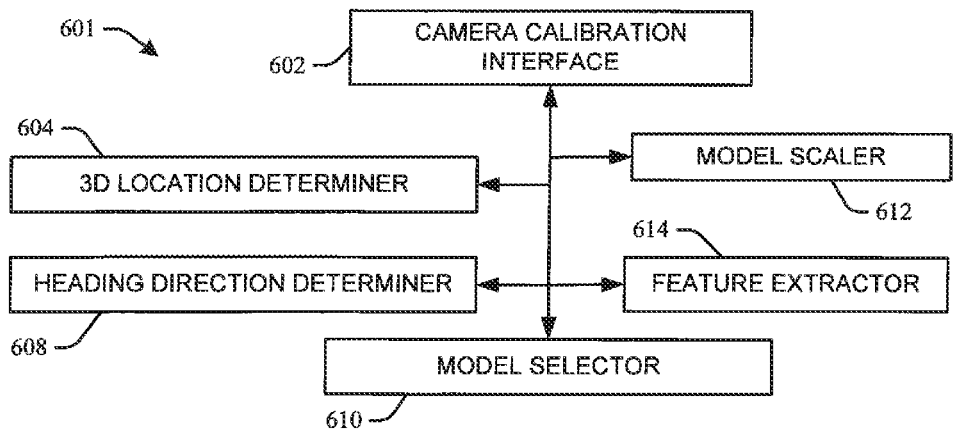
FIG. 10 is a block diagram illustration of an article according to an embodiment of the present invention.

FIG. 10 illustrates an article 601 (for example, a programmable device, system, etc.) according to the present invention that represents objects tracked within 2D video data by 3D modeling as described above. One or more of the components of the article 601 are tangible devices that perform specific functions, for example comprising the processing unit 538, the computer readable memory 516 and the computer readable storage medium 532 described above. Thus, as understood by reference to FIGS. 1-9 and the associated description material above, a Camera Calibration Interface 602 enables a user to manually calibrate a camera image field by specifying the three spatial dimensions of a 3D modeling cube within a 2D image field of view of a video data input. A 3D Location Determiner 604 determines 3D locations of an object observed in motion in the field of view of 2D video data of the calibrated camera, for example as intersections between a ground plane of the calibrated camera field of view and backward projected lines passing through a camera center and respective points on the 2D object within a focal plane in the 2D image field of view.

A Heading Direction Determiner 608 determines a heading of the object as a function of the manual calibration of the camera and the relative movement observed between determined 3D locations. A Model Selector 610 selects a polygonal 3D model and replaces the 2D object image with the selected model as a function of projected bounding box and image blob bounding box comparisons, selecting a model with a best fitting bounding box. A Model Scaler 612 scales the replacing model to fit or otherwise correspond to the object image blob bounding box, the scaling appropriate to the selected model. A Feature Extractor 614 renders the replacing polygonal 3D model with image features that are extracted from the 2D image data as a function of the calibrated dimensions of the 3D modeling cube.

Embodiments of the present invention may also perform process steps of the invention on a subscription, advertising, and/or fee basis. That is, a service provider could offer to use discrete matrices of an array of the same image sensors to obtain a plurality of different images at different f-stops from a common exposure as described above with respect to FIGS. 1-6. Thus, the service provider can create, maintain, and support, etc., a computer infrastructure, such as the network computer system 522, network environment 526, and/or the article 601 (or parts thereof) that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522/601, from a computer-readable medium device 516, 520 or 506; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for modeling objects within two-dimensional video data by three-dimensional models as a function of object type and motion, the method comprising:

in response to observing an image of an object in motion in a two-dimensional image field of view of a video data input from a camera, determining an initial three-dimensional location of the observed two-dimensional object image as an intersection between a ground plane of the camera field of view and a backward projected line passing through a center of the camera and a point on the object two-dimensional image within a focal plane in the two-dimensional image field of view of the video data input at an initial time;

determining a second three-dimensional location of the observed two-dimensional object image via the processor as an intersection between the ground plane and another backward projected line passing through the center of the camera and the point on the object two-dimensional image within the video data input two-dimensional image field of view focal plane at a second time that is subsequent to the initial time;

determining a heading direction of the object as a function of a movement of the two-dimensional object image from the determined initial three-dimensional location to the determined second subsequent three-dimensional location;

replacing the two-dimensional object image within the video data input with a selected three-dimensional polygonal model;

orienting the selected three-dimensional polygonal model replacing the two-dimensional object image within the video data input in the determined heading direction; and scaling a bounding box of the selected three-dimensional polygonal model replacing the two-dimensional object image within the video data input from the camera to fit an image blob bounding box determined for the observed two-dimensional object image.

2. The method of claim 1, further comprising:

integrating computer-readable program code into a computer system comprising a processor, a computer readable memory and a computer readable storage medium; and wherein the processor executes program code instructions stored on the computer-readable storage medium via the computer readable memory and thereby performs the steps of determining the initial three-dimensional location of the observed two-dimensional object image in response to observing the image of the object in motion in the two-dimensional image field of view of the video data input from the camera, determining the second three-dimensional location of the observed two-dimensional object image, determining the heading direction of the object, replacing the two-dimensional object image within the video data input with the selected three-dimensional polygonal model, orienting the selected three-dimensional polygonal model in the determined heading direction, and scaling the bounding box of the selected three-dimensional polygonal model within the video data input from the camera to fit the image blob bounding box determined for the observed two-dimensional object image.

3. The method of claim 1, further comprising:

selecting the selected three-dimensional polygonal model from a plurality of object-type three-dimensional polygonal models that each have projected sizes and different bounding box aspect ratios, in response to the selected three-dimensional polygonal model having:

a ratio of projected size to a size of image blob bounding box determined for the observed two-dimensional object image that meets a threshold value; and an aspect ratio that is more similar to an aspect ratio of the image blob bounding box determined for the observed two-dimensional object image, relative to the aspect ratios of the bounding boxes of others of the plurality of object-type three-dimensional polygonal models.

4. The method of claim 3, wherein the step of selecting the selected three-dimensional polygonal model from the plurality of object-type three-dimensional polygonal models further comprises:

determining for each of the models weighted sums of their respective aspect ratios and ratios of projected size to the size of the image blob bounding box determined for the observed two-dimensional object image, wherein the aspect ratios are weighted more heavily than the ratios of projected size; and selecting a model having a best weighted sum value as the selected model.

5. The method of claim 4, further comprising:

selecting the model having a best weighted sum value as the selected model from a subset of the models that each have an aspect ratio similarity to the aspect ratio of the image blob bounding box that satisfies a threshold condition.

6. The method of claim 4, further comprising:

selecting one of a single-dimension scaling process and a multi-dimension scaling process as appropriate to the object type of the replacing polygonal three-dimensional model, wherein the single-dimension and multi-dimension scaling processes are appropriate to different ones of the object types of the polygonal three-dimensional model; and wherein the scaling the bounding box ratio of the replacing polygonal three-dimensional model comprises using the selected one of the single-dimension scaling process and the multi-dimension scaling process.

7. The method of claim 6, wherein the selected scaling process is the single-dimension scaling process, and wherein the scaling the bounding box ratio of the replacing polygonal three-dimensional model to correspond to the object image blob bounding box ratio comprises:

determining a first spatial dimension of three-dimensional spatial dimensions of the projected bounding box of the selected model, the first spatial dimension of the object image blob bounding box, and a first spatial dimension ratio between the determined selected model first spatial dimension and the determined object image blob bounding box first spatial dimension;

scaling the bounding box of the selected model in the first dimension by the determined first spatial dimension ratio to match the object image blob bounding box; and shifting the selected model so that a location point of the selected model on a boundary box line of the projected bounding box of the selected model that is normal to an axis of the first dimension is co-located with a corresponding point of the object image blob on a corresponding boundary box line of the object image blob bounding box, wherein the selected model location point is on a back projection line comprising the corresponding point of the object image blob and the center of the camera.

8. The method of claim 6, wherein the selected scaling process is the multi-dimension scaling process, and wherein the scaling the bounding box ratio of the replacing polygonal three-dimensional model to correspond to the object image blob bounding box ratio comprises:

determining a first dimensional vector of three-dimensional spatial dimensions of the two-dimensional object image blob bounding box in image space on the image ground plane aligned with a first dimension axis of the object image blob bounding box;

determining a second dimensional vector of the three-dimensional spatial dimensions of the two-dimensional object image blob bounding box in image space on the image ground plane through alignment with a second dimension axis of the object image blob bounding box;

determining a heading direction vector as a function of calibrating of the camera and the movement of the two-dimensional object image from the determined initial three-dimensional location to the determined second subsequent three-dimensional location;

determining a third dimension vector perpendicular to the heading vector and aligned with a third dimension axis of the three-dimensional spatial dimensions;

projecting the first dimensional vector to the heading direction vector and the third dimension vector to obtain first projected dimension scaling factors for each of the first dimension and the second dimension;

projecting the second dimensional vector to the heading direction vector and the third dimension vector to obtain second projected dimension scaling factors for each of the first dimension and the second dimension;

determining a final scaling factor for the first dimension by summing the first and second projected dimension scaling factors obtained for the first dimension;

determining a final scaling factor for the second dimension by summing the first and second projected dimension scaling factors obtained for the second dimension;

selecting one of the determined final first and second dimension scaling factors as a final third dimension scaling factor; and scaling each of the three dimensions of the selected model by their respective final first, second and third dimension scaling factors.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
in response to observing an image of an object in motion in a two-dimensional image field of view of a video data input from a camera, determines an initial three-dimensional location of the observed two-dimensional object image as an intersection between a ground plane of the camera field of view and a backward projected line passing through a center of the camera and a point on the object two-dimensional image within a focal plane in the two-dimensional image field of view of the video data input at an initial time;

determines a second three-dimensional location of the observed two-dimensional object image via the processor as an intersection between the ground plane and another backward projected line passing through the center of the camera and the point on the object two-dimensional image within the video data input two-dimensional image field of view focal plane at a second time that is subsequent to the initial time;

determines a heading direction of the object as a function of a movement of the two-dimensional object image from the determined initial three-dimensional location to the determined second subsequent three-dimensional location;

replaces the two-dimensional object image within the video data input with a selected three-dimensional polygonal model;

orients the selected three-dimensional polygonal model replacing the two-dimensional object image within the video data input in the determined heading direction; and scales a bounding box of the selected three-dimensional polygonal model replacing the two-dimensional object image within the video data input from the camera to fit an image blob bounding box determined for the observed two-dimensional object image.

10. The system of claim 9, wherein the processor executes the program instructions stored on the computer-readable storage medium via the computer readable memory and thereby further:

selects the selected three-dimensional polygonal model from a plurality of object-type three-dimensional polygonal models that each have projected sizes and different bounding box aspect ratios, in response to the selected three-dimensional polygonal model having:
a ratio of projected size to a size of image blob bounding box determined for the observed two-dimensional object image that meets a threshold value; and
an aspect ratio that is more similar to an aspect ratio of the image blob bounding box determined for the observed two-dimensional object image, relative to the aspect ratios of the bounding boxes of others of the plurality of object-type three-dimensional polygonal models.

11. The system of claim 10, wherein the processor executes the program instructions stored on the computer-readable storage medium via the computer readable memory and thereby selects the selected three-dimensional polygonal model from the plurality of object-type three-dimensional polygonal models by:

determining for each of the models weighted sums of their respective aspect ratios and ratios of projected size to the size of the image blob bounding box determined for the observed two-dimensional object image, wherein the aspect ratios are weighted more heavily than the ratios of projected size; and selecting a model having a best weighted sum value as the selected model.

12. The system of claim 11, wherein the processor executes the program instructions stored on the computer-readable storage medium via the computer readable memory and thereby selects the model having a best weighted sum value as the selected model from a subset of the models that each have an aspect ratio similarity to the aspect ratio of the image blob bounding box that satisfies a threshold condition.

13. The system of claim 11, wherein the processor executes the program instructions stored on the computer-readable storage medium via the computer readable memory and thereby selects one of a single-dimension scaling process and a multi-dimension scaling process as appropriate to the object type of the replacing polygonal three-dimensional model;
   wherein the single-dimension and multi-dimension scaling processes are appropriate to different ones of the object types of the polygonal three-dimensional model; and
   wherein the scaling the bounding box ratio of the replacing polygonal three-dimensional model comprises using the selected one of the single-dimension scaling process and the multi-dimension scaling process.

14. The system of claim 13, wherein the processor executes the program instructions stored on the computer-readable storage medium via the computer readable memory and thereby scales the bounding box of the selected three-dimensional polygonal model by using the single-dimension scaling process; and
   wherein the single-dimension scaling process comprises:
      determining a first spatial dimension of three-dimensional spatial dimensions of the projected bounding box of the selected model, the first spatial dimension of the object image blob bounding box, and a first spatial dimension ratio between the determined selected model first spatial dimension and the determined object image blob bounding box first spatial dimension;
      scaling the bounding box of the selected model in the first dimension by the determined first spatial dimension ratio to match the object image blob bounding box; and
      shifting the selected model so that a location point of the selected model on a boundary box line of the projected bounding box of the selected model that is normal to an axis of the first dimension is co-located with a corresponding point of the object image blob on a corresponding boundary box line of the object image blob bounding box, wherein the selected model location point is on a back projection line comprising the corresponding point of the object image blob and the center of the camera.

15. The system of claim 13, wherein the processor executes the program instructions stored on the computer-readable storage medium via the computer readable memory and thereby scales the bounding box of the selected three-dimensional polygonal model by using the multi-dimension scaling process; and
   wherein the multi-dimension scaling process comprises:
      determining a first dimensional vector of three-dimensional spatial dimensions of the two-dimensional object image blob bounding box in image space on the image ground plane aligned with a first dimension axis of the object image blob bounding box;
      determining a second dimensional vector of the three-dimensional spatial dimensions of the two-dimensional object image blob bounding box in image space on the image ground plane through alignment with a second dimension axis of the object image blob bounding box;
      determining a heading direction vector as a function of calibrating of the camera and the movement of the two-dimensional object image from the determined initial three-dimensional location to the determined second subsequent three-dimensional location;
      determining a third dimension vector perpendicular to the heading vector and aligned with a third dimension axis of the three-dimensional spatial dimensions;
      projecting the first dimensional vector to the heading direction vector and the third dimension vector to obtain first projected dimension scaling factors for each of the first dimension and the second dimension;
      projecting the second dimensional vector to the heading direction vector and the third dimension vector to obtain second projected dimension scaling factors for each of the first dimension and the second dimension;
      determining a final scaling factor for the first dimension by summing the first and second projected dimension scaling factors obtained for the first dimension;
      determining a final scaling factor for the second dimension by summing the first and second projected dimension scaling factors obtained for the second dimension;
      selecting one of the determined final first and second dimension scaling factors as a final third dimension scaling factor; and
      scaling each of the three dimensions of the selected model by their respective final first, second and third dimension scaling factors.

16. A computer program product for modeling objects within two-dimensional video data by three-dimensional models as a function of object type and motion, the computer program product comprising:
   a computer readable hardware storage device having computer readable program code embodied therewith, the computer readable program code comprising instructions for execution by a processor that cause the processor to:
   in response to observing an image of an object in motion in a two-dimensional image field of view of a video data input from a camera, determine an initial three-dimensional location of the observed two-dimensional object image as an intersection between a ground plane of the camera field of view and a backward projected line passing through a center of the camera and a point on the object two-dimensional image within a focal plane in the two-dimensional image field of view of the video data input at an initial time;
   determine a second three-dimensional location of the observed two-dimensional object image via the processor as an intersection between the ground plane and another backward projected line passing through the center of the camera and the point on the object two-dimensional image within the video data input two-dimensional image field of view focal plane at a second time that is subsequent to the initial time;
   determine a heading direction of the object as a function of a movement of the two-dimensional object image from the determined initial three-dimensional location to the determined second subsequent three-dimensional location;
   replace the two-dimensional object image within the video data input with a selected three-dimensional polygonal model;
   orient the selected three-dimensional polygonal model replacing the two-dimensional object image within the video data input in the determined heading direction; and
   scale a bounding box of the selected three-dimensional polygonal model replacing the two-dimensional object image within the video data input from the camera to fit an image blob bounding box determined for the observed two-dimensional object image.

17. The computer program product of claim 16, wherein the computer readable program code instructions for execution by the processor further cause the processor to:
   select the selected three-dimensional polygonal model from a plurality of object-type three-dimensional polygonal models that each have projected sizes and different bounding box aspect ratios, in response to the selected three-dimensional polygonal model having:
- a ratio of projected size to a size of image blob bounding box determined for the observed two-dimensional object image that meets a threshold value; and
- an aspect ratio that is more similar to an aspect ratio of the image blob bounding box determined for the observed two-dimensional object image, relative to the aspect ratios of the bounding boxes of others of the plurality of object-type three-dimensional polygonal models.

18. The computer program product of claim 17, wherein the computer readable program code instructions for execution by the processor further cause the processor to select the selected three-dimensional polygonal model from the plurality of object-type three-dimensional polygonal models by:
- determining for each of the models weighted sums of their respective aspect ratios and ratios of projected size to the size of the image blob bounding box determined for the observed two-dimensional object image, wherein the aspect ratios are weighted more heavily than the ratios of projected size; and
- selecting a model having a best weighted sum value as the selected model.

19. The computer program product of claim 18, wherein the computer readable program code instructions for execution by the processor further cause the processor to select the model having a best weighted sum value as the selected model from a subset of the models that each have an aspect ratio similarity to the aspect ratio of the image blob bounding box that satisfies a threshold condition.

20. The computer program product of claim 17, wherein the computer readable program code instructions for execution by the processor further cause the processor to select one of a single-dimension scaling process and a multi-dimension scaling process as appropriate to the object type of the replacing polygonal three-dimensional model;
- wherein the single-dimension and multi-dimension scaling processes are appropriate to different ones of the object types of the polygonal three-dimensional model; and
- wherein the scaling the bounding box ratio of the replacing polygonal three-dimensional model comprises using the selected one of the single-dimension scaling process and the multi-dimension scaling process.

* * * * *